US008806528B1

(12) United States Patent
Streeter et al.

(10) Patent No.: US 8,806,528 B1
(45) Date of Patent: Aug. 12, 2014

(54) MEDIATING DIGITAL PROGRAM INSERTION FOR LINEAR STREAMING MEDIA

(75) Inventors: Kevin Streeter, San Bruno, CA (US); Seth Hodgson, Oakland, CA (US); Bradley Outlaw, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 156 days.

(21) Appl. No.: 13/309,794

(22) Filed: Dec. 2, 2011

(51) Int. Cl.
*H04H 60/33* (2008.01)
*H04N 21/258* (2011.01)
*H04N 21/435* (2011.01)
*H04N 21/81* (2011.01)

(52) U.S. Cl.
CPC ......... *H04H 60/33* (2013.01); *H04N 21/25883* (2013.01); *H04N 21/435* (2013.01); *H04N 21/812* (2013.01)
USPC ................................. 725/32; 725/16; 725/35

(58) Field of Classification Search
CPC ............ H04H 60/33; H04N 21/25883; H04N 21/812; H04N 21/435
USPC .......................................... 725/14, 32, 16, 35
See application file for complete search history.

(56) References Cited

U.S. PATENT DOCUMENTS

| 6,112,186 | A | * | 8/2000 | Bergh et al. | 705/7.32 |
| 7,117,518 | B1 | * | 10/2006 | Takahashi et al. | 725/86 |
| 7,430,360 | B2 | * | 9/2008 | Abecassis | 386/343 |
| 8,010,978 | B2 | * | 8/2011 | Park et al. | 725/34 |
| 8,074,882 | B2 | * | 12/2011 | Dmitriev et al. | 235/383 |
| 8,176,510 | B2 | * | 5/2012 | Craner | 725/28 |
| 2002/0087976 | A1 | * | 7/2002 | Kaplan et al. | 725/34 |
| 2005/0039205 | A1 | | 2/2005 | Riedl | |
| 2006/0075449 | A1 | | 4/2006 | Jagadeesan et al. | |
| 2007/0124756 | A1 | * | 5/2007 | Covell et al. | 725/18 |
| 2008/0155614 | A1 | * | 6/2008 | Cooper et al. | 725/91 |
| 2008/0276270 | A1 | | 11/2008 | Kotaru et al. | |
| 2009/0028182 | A1 | * | 1/2009 | Brooks et al. | 370/466 |
| 2009/0034426 | A1 | * | 2/2009 | Luft et al. | 370/252 |
| 2009/0100459 | A1 | * | 4/2009 | Riedl et al. | 725/35 |
| 2009/0164655 | A1 | * | 6/2009 | Pettersson et al. | 709/231 |
| 2009/0172757 | A1 | * | 7/2009 | Aldrey et al. | 725/110 |
| 2009/0187939 | A1 | | 7/2009 | LaJoie | |
| 2010/0122293 | A1 | * | 5/2010 | Craner | 725/40 |
| 2010/0131385 | A1 | * | 5/2010 | Harrang et al. | 705/26 |
| 2010/0250672 | A1 | * | 9/2010 | Vance et al. | 709/204 |
| 2011/0154385 | A1 | * | 6/2011 | Price et al. | 725/12 |
| 2011/0283189 | A1 | * | 11/2011 | McCarty | 715/707 |
| 2012/0059845 | A1 | * | 3/2012 | Covell et al. | 707/769 |

* cited by examiner

*Primary Examiner* — Nasser Goodarzi
*Assistant Examiner* — Michael B Pierorazio
(74) *Attorney, Agent, or Firm* — Kilpatrick Townsend & Stockton LLP

(57) ABSTRACT

Exemplary embodiments involve a mediation application executed on a processor determining one or more digital programming insertion breaks in a linear media stream. The linear media stream can include electronic content delivered over a network at a time determined by the content provider. The mediation application can determine that a plurality of clients identified by a common group identifier and in communication with the mediation application are receiving the linear media stream. The mediation application can mediate a plurality of requests for digital programming insertion content provided by a digital programming insertion content provider by identifying digital programming insertion content targeted to the common group identifier. The mediation application can provide the digital programming insertion content during the one or more digital programming insertion breaks to the plurality of clients.

18 Claims, 4 Drawing Sheets

MEDIATING DIGITAL PROGRAM INSERTION FOR LINEAR STREAMING MEDIA

TECHNICAL FIELD

This disclosure relates generally to computer software and more particularly relates to mediating digital program insertion for linear streaming media.

BACKGROUND

Electronic content, such as television content, can be provided to clients over the internet. Examples of television content provided over the internet can include static content, such as video-on-demand, that is pre-recorded. Providing television content over the internet can include digitally inserting other programming content, such as advertisements, into the television content. Digitally inserted programming content can be included with the static content during pre-defined breaks in the static content.

Providing television-style electronic content with digital program insertion ("DPI") to streaming media can pose several challenges for content providers. One challenge can include targeting of DPI content, such as advertisements, to certain groups. For example, advertisers may target ads to specific demographics, such as males of ages 24-36. Such targeting may be further refined by region or geography. Furthermore, providers of online advertising content may seek to target narrowly defined groups based on tracking preferences of content subscribers.

A second challenge associated with DPI is scalability. Targeting DPI content can be difficult with respect to streaming media due to the need for individualizing requests for DPI content based on the preferences of single viewers or small groups of viewers. Individualizing requests for DPI content can place additional loads on systems managing the insertion of DPI content, thereby increasing the difficulty of scaling the systems to service large audiences.

SUMMARY

Systems and methods are disclosed for mediating digital program insertion ("DPI") for linear streaming media. An exemplary embodiment involves a mediation application executed on a processor determining one or more DPI breaks in a linear media stream. The linear media stream can include electronic content delivered over a network at a time determined by the content provider. The mediation application can determine that a plurality of clients identified by a common group identifier and in communication with the mediation application are receiving the linear media stream. The mediation application can mediate a plurality of requests for digital programming insertion content provided by a digital programming insertion content provider by identifying the digital programming insertion content from the digital programming insertion content provider targeted to the common group identifier. The mediation application can provide the DPI content during the one or more DPI breaks to the plurality of clients.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
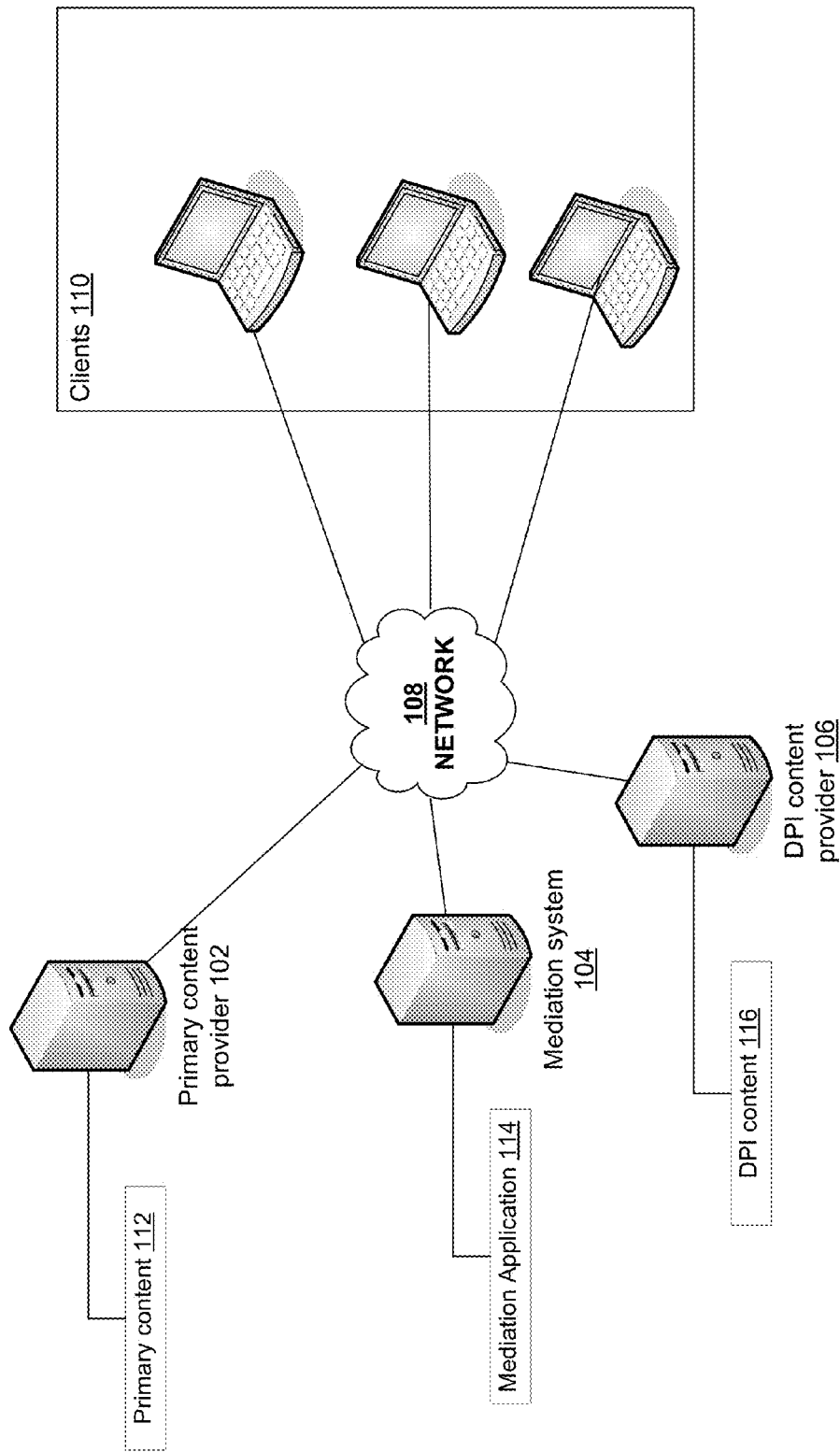
FIG. 1 is a network diagram illustrating a mediation system in communication with a primary content provider, a DPI content provider, and clients.

Systems and methods are provided for mediating digital program insertion for linear streaming media. The systems and methods can enhance the ability of DPI content providers to target DPI content to specific groups of subscribers while maintaining the scalability of systems providing the DPI content.

The following example illustrates how a mediation system can mediate the provision of DPI content with a linear media stream. An exemplary linear media stream can include a sporting event broadcast in real time over the internet. A user can request the sporting event via a client, such as a website CableChannel.xyz, from a primary content provider. The provider of the sporting event can sell advertising time to several providers of DPI content, such as advertising content. A plurality of users can request advertising content via plurality of clients during breaks in the sporting event designated for providing advertising content.

The requests for the sporting event and the advertising content can be routed through from the client to the content providers via an exemplary mediation system. The mediation system can determine that a group of users requesting the DPI content via the clients share at least one common characteristic, such as a demographic group or geographic location. The mediation system can consolidate the requests by providing a single request to the advertisement provider for content targeted to the group, obviating the need for each client to individually request content from the advertisement provider. For example, if one million users belong to the same group targeted by an advertisement provider, the advertisement provider will receive a single content request from a mediation system rather than one million separate content requests from individual clients. The mediation system can determine the advertising content provided to different groups of users based on the characteristic shared by the users (e.g., geographical location). Users from a zip code 12345 may receive advertising content from a first DPI content provider while users from a zip code 54321 may receive advertising content from a second DPI content provider. Accordingly, the exemplary mediation system can minimize the load on each DPI content provider while also allowing different DPI content to be provided to different groups targeted to receive the DPI content.

A mediation application executed by a processor of a computing system can determine the positions of one or more DPI breaks included in a linear media stream. The linear media stream can include electronic content delivered over a network, such as the internet, at a time determined by the content provider. The mediation application can determine that a plurality of clients identified by a common group identifier are in communication with the mediation application and are receiving the linear media stream. The mediation application mediate a plurality of requests for digital programming insertion content provided by a digital programming insertion content provider by identifying the digital programming insertion content from the digital programming insertion content provider targeted to the common group identifier. The mediation application can provide the digital programming insertion content during the one or more digital programming insertion breaks to the plurality of clients.

As used herein, the term "digital programming insertion" ("DPI") is used to refer to systems and methods for providing DPI content along with primary content. As used herein, "primary content" is used to refer to electronic content being provided by a primary content provider accessed by a subscriber. As used herein, "DPI content" is used to refer to electronic content provided by a DPI content provider with the primary content. As used herein, the term "content provider" is used to refer to a computing system, such as a server, that can provide electronic content via a network such as the internet. Examples of electronic content can include, but are not limited to, video files, audio files, image files, text files, other applications, etc. Primary content, such as a media stream displaying a television episode that a subscriber has selected for playback, is distinguished from DPI content, such as advertisements or other short programs, requested by the client without input from a subscriber. DPI content can be inserted into primary content during a DPI break. A DPI break can include, for example, an interval of time during a media stream set aside for an advertisement provider to insert advertisements into the media stream. DPI content can also be inserted during a geography-based blackout for primary content. One example of a geography-based blackout is a blackout of primary content for insertion of an emergency alert services message specific to a geographic area. Another example of a geography-based blackout is a blackout of unlicensed content for a specific region, such as when a local television station has a license to broadcast a sporting event in the region where the sporting event takes place and an online content provider has a license to broadcast the sporting event for all areas excluding that region.

As used herein, the term "linear media stream" is used to refer to electronic content delivered over a network at a time determined by the content provider. In contrast to video-on-demand ("VOD") content, a client application does not determine a time at which the content provider broadcasts the linear media stream. One example of a linear media stream can include, but are not limited to, an event (e.g., a football game) being broadcasted in real time over the internet. Another example of a linear media stream can include pre-recorded content broadcast over the internet at a time selected by the content provider so that the pre-recorded content is presented to an online audience in the same manner as a live event.

As used herein, the term "client" is used to refer to an instance of a client application requesting and receiving electronic content from a primary content provider or a DPI content provider. The client can request the electronic content from the primary content provider or the DPI content provider and provide the electronic content to a plurality of subscribers. For example, a client providing electronic content may be a website or web portal, such as CableChannel.xyz, providing a live sporting event to one or more subscribers. An instance of the client can be a connection established over the internet between the website CableChannel.xyz and a particular subscriber. Different clients, such as CableChannel.xyz and Competitor CableChannel.xyz, may provide the same live sporting event to multiple subscribers. The client application can execute at a computing device receiving input from a user or at a server being remotely accessed by the computing device. For example, a first client may be a website CableChannel.xyz accessed via the internet while a second client may be a media player executing at the subscriber's computer. The client application can provide data to a primary content provider or a DPI content provider describing a subscriber receiving the electronic content. The data can include a common group identifier to the mediation application.

As used herein, the term "subscriber" is used to refer to a user viewing electronic content via a client.

As used herein, the term "group identifier" is used to refer to one or more criteria identifying a group of subscribers satisfying the one or more criteria. Examples of a group identifier can include, but are not limited to, demographic information of a subscriber using the client or a geographic location of a computing system associated with the client.

As used herein, the term "mediate" is used to refer to consolidating or otherwise processing requests for digital programming insertion content so as to minimize the number of individual requests for the same digital programming insertion content received by a given digital programming insertion content provider.

In an exemplary embodiment, determining the DPI breaks in a linear media stream can involve receiving data identifying one or more intervals in the linear media stream available for digital programming insertion. The mediation application can identify one or more cues in the primary content for inserting DPI content. For example, a primary content provider providing a football game as a linear media stream can provide data to the mediation application identifying such cues. The data can indicate that a "time out" or other break in play during the game has occurred. The mediation application can also receive content requests for the DPI content during the linear media stream. Based on receiving the requests, the mediation application can determine that the DPI content can be provided during the one or more intervals.

In an exemplary embodiment, determining that multiple clients are identified by a common group identifier can include one or more DPI content providers providing a group identifier to the mediation application. The group identifiers can identify groups to which the DPI providers are targeting particular content. The group identifiers can include, for example, a group identifier for males ages 16-24, a group identifier for females ages 30-45, and a group identifier for clients in the southwestern United States. A mediation application can determine subscribers having a common group identifier by comparing the group identifiers provided by the one or more DPI content providers with subscriber information provided by clients requesting DPI content. For example, each of a plurality of clients can provide the age and gender of a subscriber stored in a subscriber profile for the client application or a location of the subscriber determined from the IP address from which a content request originates.

In an exemplary embodiment, identifying the DPI content can include retrieving DPI content from a DPI content provider in response to a content request from a first client. The DPI content can be stored in memory at the mediation system. The mediation application can thus communicate a single request for DPI content that can be provided to multiple clients. Communicating a single request for DPI content to be provided to multiple clients can reduce the number of content requests for the same content that the DPI content provider must process, thereby decreasing the load on the DPI content provider.

In additional or alternative embodiments, identifying DPI content targeted to the common group identifier can include the mediation application requesting DPI content specific to a group each time a client provides a group identifier different from any group identifiers previously provided to the mediation application. The mediation application can receive a request associated with a first subscriber from a client for DPI content. The mediation application can determine whether it has previously requested DPI content in response to a different request associated with a previous subscriber having the same group identifier. If so, the mediation application can provide the same DPI content to the requesting subscriber. If not, the mediation application can request DPI content from a DPI content provider associated with the group identifier of the requesting subscriber.

In additional or alternative embodiments, the DPI content can be provided based on input received from one or more representative clients. For example, a mediation system may communicate with 1 million clients receiving primary content. The primary content may include several DPI breaks. At each DPI break, the mediation application may solicit input from a percentage of the clients designated as representative clients for each group to identify the DPI content that the mediation application should provide to the clients in the group. The mediation application can provide DPI content to all of the clients in the group associated with the representative client based on a content request received from the representative client.

In additional or alternative embodiments, the mediation application can format the DPI content for delivery to the clients. For example, DPI content provided to clients may be provided to different device types or in different data formats within the group of clients. Accordingly, the mediation application, rather than the DPI content provider, can format the DPI content for delivery to the client based on the different device types or data formats within the group of clients.

In additional or alternative embodiments, the mediation application can manage multiple content renditions of common DPI content to be provided to multiple clients to ensure quality of service for the streaming DPI content. Different renditions of DPI content can be encoded at different bit rates and sizes for use by clients with different connection speeds. The mediation application can manage a set including multiple renditions of the same DPI content, thereby ensuring uniform treatment of the multiple renditions of the set. For example, a mediation application targeting a given DPI content item to a group can target an entire set of renditions of the given DPI content item to the group. When providing a DPI content item to a specific client, the mediation application can select a rendition of the DPI content item from the set that is appropriate for a data connection with the specific client. The mediation application can determine the rendition appropriate for the data connection based on, for example, the speed of the data connection. The mediation application can determine a transmission rate for providing the DPI content that most closely matches (i.e., that is less than or equal to) the transmission rate of the primary content. Accordingly, a subscriber can view the DPI content without discerning a difference in quality between the primary content included in a linear media stream and the DPI content provided with the linear media stream.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating a mediation system 104 in communication with a primary content provider 102, a DPI content provider 106, and clients 110.

The primary content provider 102 can be a computing system hosting primary content 112. The computing system can include, but is not limited to, a server system, a cloud computing system, and/or a grid computing system. The primary content provider 102 can provide primary content 112 to clients 110 via the network 108. The primary content 112 can include a linear media stream.

The mediation system 104 can be a computing system hosting a mediation application 114. The computing system can include, but is not limited to, a server system, a cloud computing system, and/or a grid computing system. In one embodiment, the mediation system 104 can be a separate system in communication with the primary content provider 102 via the network 108, as depicted in FIG. 1. In additional or alternative embodiments, the mediation system 104 can be a sub-system of the primary content provider 102.

The mediation system 104 can communicate with different types of DPI content providers 106 hosting DPI content 116. The DPI content providers 106 can be computing systems such as, but not limited to, server systems, a cloud computing systems, and/or grid computing systems. Each of the DPI content providers 106 can be, for example, different advertisement servers providing DPI content 116 that includes various advertisements for insertion into the linear media stream included in the primary content 112.

The DPI content providers 106 may lack the capability to provide the DPI content 116 in a streaming format to clients 110. The mediation system 104 can receive DPI content 116 from the DPI content providers 106. The mediation application 114 of the mediation system 104 can format the DPI content 116 for insertion into a linear media stream.

The clients 110 can be instances of one or more client applications executing or otherwise using electronic content at client computing systems. Examples of a client computing system can include, but are not limited to, a desktop computer, a laptop computer, a tablet computer, a smart phone, a gaming console, a smart television with internet-related features (e.g., streaming video capability, built-in digital recording), etc. The client computing systems can be used by subscribers executing or otherwise using the primary content 112 and/or the DPI content 116. In some embodiments, the clients 110 can be instances of a website accessed from a client system. For example, the clients 110 depicted in FIG. 1 may correspond to a plurality of client systems accessing a website providing the primary content 112 received from the primary content provider 102 and/or the DPI content 116 received from the DPI content providers 106. In other embodiments, the clients 110 can be applications executing or otherwise using the instances of a website at a client computing system. An example of such an application is a media player.

Figure 2:
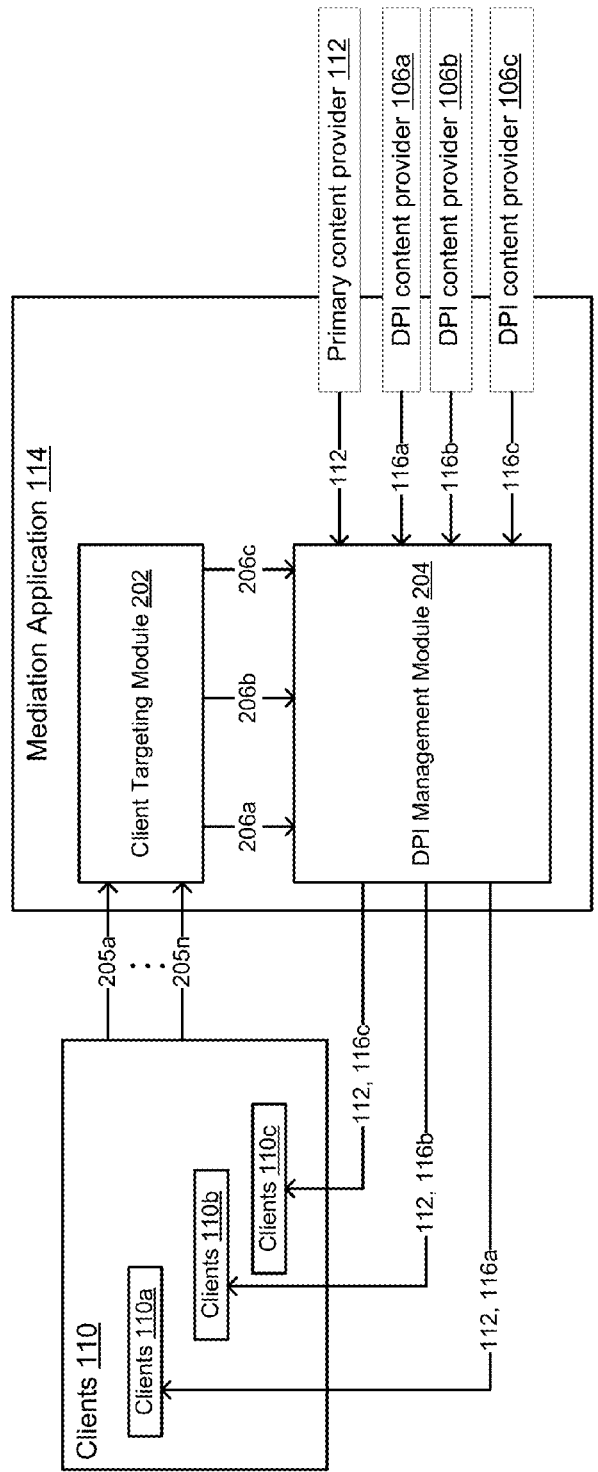
FIG. 2 is a modeling diagram illustrating an exemplary flow of communications among a mediation application, primary and DPI content providers, and clients.

FIG. 2 is a modeling diagram illustrating an exemplary flow of communications among a mediation application 114, a primary content provider 102 and DPI content providers 106a-c, and clients 110. The mediation application 114 can include a client targeting module 202 and a DPI management module 204.

The mediation application 114 can receive content requests 205a-n from clients 110, primary content 112 from the primary content provider 102, and DPI content 116a-c from DPI content providers 106a-c, respectively. The content requests 205a-n can include requests for the DPI content 116 to be provided with the linear media stream included in the primary content 112.

The client targeting module 202 of the mediation application 114 can resolve the content requests 205a-n from individual clients 110 into groups associated with the group identifiers 206a-c based on a common group identifier. As depicted in FIG. 2, the content requests 205a-n are resolved into groups associated with the group identifiers 206a-c. The content requests for each of the groups are identified by a common group identifier. The value of the group identifier can be, for example, a character string, number, etc. In some embodiments, the group identifiers can identify groups belonging to a common demographic. For example, a group identifier may identify clients associated with subscribers who are males of ages 16 to 24 or college graduates with three to five years of work experience. In additional or alternative embodiments, the group identifiers can identify groups based on the location of the client. For example, a group identifier may include clients associated with network addresses located in certain states or regions.

For example, a client 110 may provide primary content 112, such as television content, requested from a primary content provider 102 to a subscriber. The client 110 may provide subscriber data such as the age, address, and household income of the subscriber to the primary content provider 102 when requesting the television content. The client targeting module 202 can use the subscriber data to identify a group for the client based on a group identifier corresponding to one or more of the subscriber details.

The DPI management module 204 can perform DPI targeting to create targeted output for each group identified by the client targeting module 202. For example, when the client 110 executes or otherwise uses the primary content 112, the DPI management module 204 can identify DPI breaks in the primary content 112. The DPI management module 204 can notify a client of program insertions targeted for a group to which the client belongs.

The DPI management module 204 can receive DPI content 116a-c and target the content based on groups associated with the group identifiers 206a-c. The DPI management module 204 can associate groups associated with the group identifiers 206a-c with clients 110a-c, respectively.

DPI content 116a can be targeted to the group associated with group identifier 206a. The DPI management module 204 can identify DPI breaks in primary content 112 and insert DPI content 116a. A combination of primary content 112 including a linear media stream and DPI content 116a can be provided to a group of clients 110a corresponding to the group identifier 206a.

DPI content 116b can be targeted to the group associated with group identifier 206b. The DPI management module 204 can identify DPI breaks in primary content 112 and insert DPI content 116b. A combination of primary content 112 including the linear media stream and DPI content 116b can be provided to a group of clients 110b corresponding to the group identifier 206b.

DPI content 116c can be targeted to the group associated with group identifier 206c. The DPI management module 204 can identify DPI breaks in primary content 112 and insert DPI content 116c. A combination of primary content 112 including the linear media stream and DPI content 116c can be provided to a group of clients 110c corresponding to the group identifier 206c.

The specific form and frequency of the communication between the clients 110 and the mediation application 114 executed at the mediation system 104 can vary based on the streaming protocol used for the communication. For example, the mediation application 114 may generate an Action Message Format ("AMF") message for the mediation system 104 to send to a client using a Real Time Messaging Protocol ("RTMP") protocol. The AMF message may inform the client that a DPI break has been identified. The client can then request DPI content 116 from the mediation application 114. Alternatively, a client using the Adobe® HTTP Dynamic Streaming ("HDS") protocol may contact the mediation application 114 at regular intervals for updates to a content manifest file maintained by the client. The mediation application 114 may thus provide DPI content 116 along with each update to the content manifest file.

Figure 3:
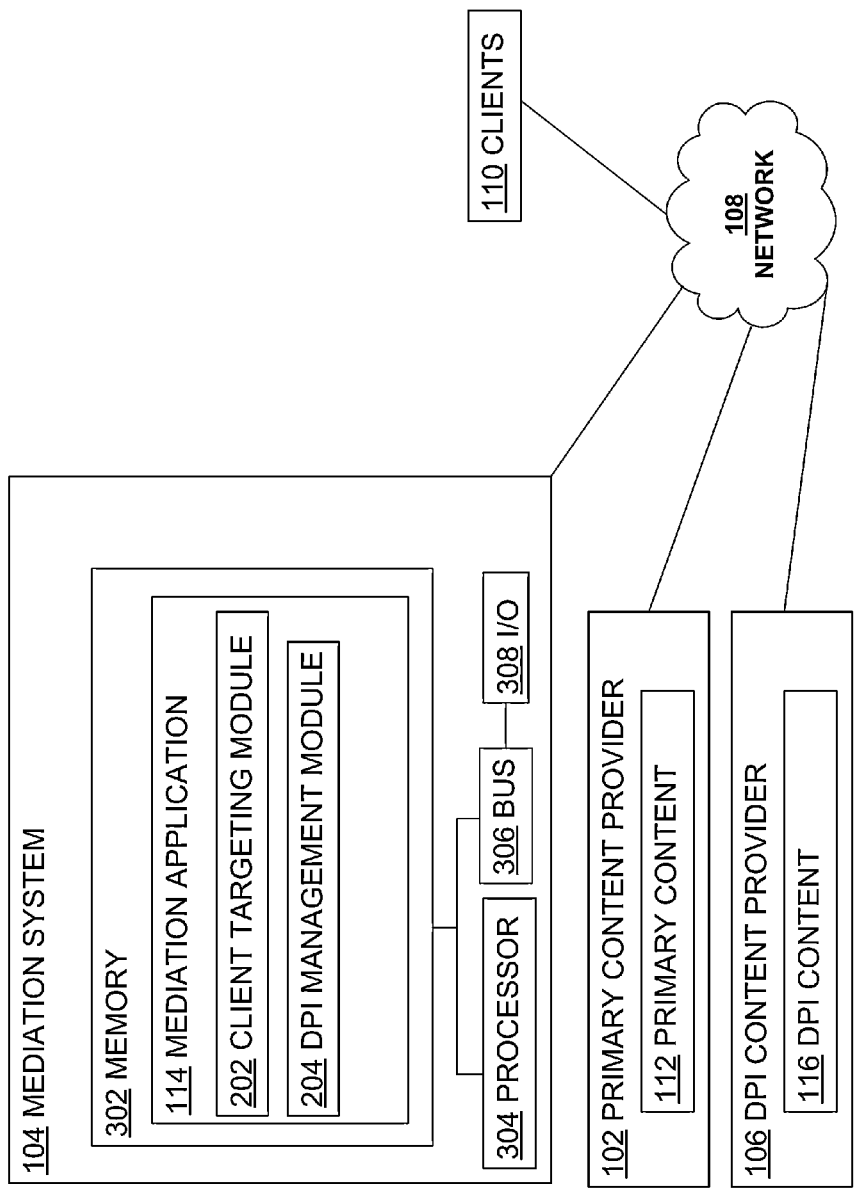
FIG. 3 is a block diagram depicting exemplary computing devices in an exemplary computing environment for implementing certain embodiments.

FIG. 3 is a block diagram depicting exemplary computing devices in an exemplary computing environment for implementing certain embodiments. Mediation application 114 executes or is otherwise used on the exemplary mediation system 104 and is shown using functional components or modules. As is known to one of skill in the art, such electronic content may be resident in any suitable non-transitory computer-readable medium and can be executed on any suitable processor.

For example, as shown, an exemplary mediation system 104 can include a non-transitory computer-readable medium, such as a random access memory (RAM) 302, coupled to a processor 304 that executes computer-executable program instructions and/or accesses information stored in a memory 302. Such a processor 304 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 304, cause the processor 304 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The mediation system 104 can receive input and provide output via input/output (I/O) interface 308. I/O interface 308 can include, for example, a network interface for communication via the network 108. A bus, such as bus 306, is included in the mediation system 104. Mediation system 104 can be any type of computing system included in a network at a domain appropriate for providing one or more of the features described herein.

FIG. 3 illustrates an exemplary mediation system 104 that includes, in a memory 302, mediation application 114. The mediation application 114 can include client targeting module 202 and DPI management module 204. The mediation application 114 can execute client targeting module 202 to configure the processor 304 to resolve content requests received via I/O interface 308 to client groups. The mediation application 114 can execute DPI management module 204 to configure the processor 304 to retrieve primary content 112 from a primary content provider 102 and DPI content 116 from DPI content provider 106, load the primary content 112 and DPI content 116 into the memory 302, and orchestrating the combination of the primary content 112 and DPI content 116. The primary content 112 and DPI content 116 can include, but is not limited to, streaming video files, audio files, image files, and other media content. Orchestrating the combination of the primary content 112 and DPI content 116 can including specifying how data packets comprising the primary content 112 and DPI content 116 should be combined when the data packets are received by clients 110. The mediation application 114 can configure the processor 304 to provide the primary content 112 and DPI content 116 to clients 110 via I/O interface 308.

The primary content provider 102 and DPI content provider 106 can be any sources of data that provide data upon request, pushed data, or otherwise provides data items for use by other applications. The primary content provider 102 and DPI content provider 106 can include, but are not limited to, a dedicated server devices, cloud computing systems, and/or grid computing systems.

Figure 4:
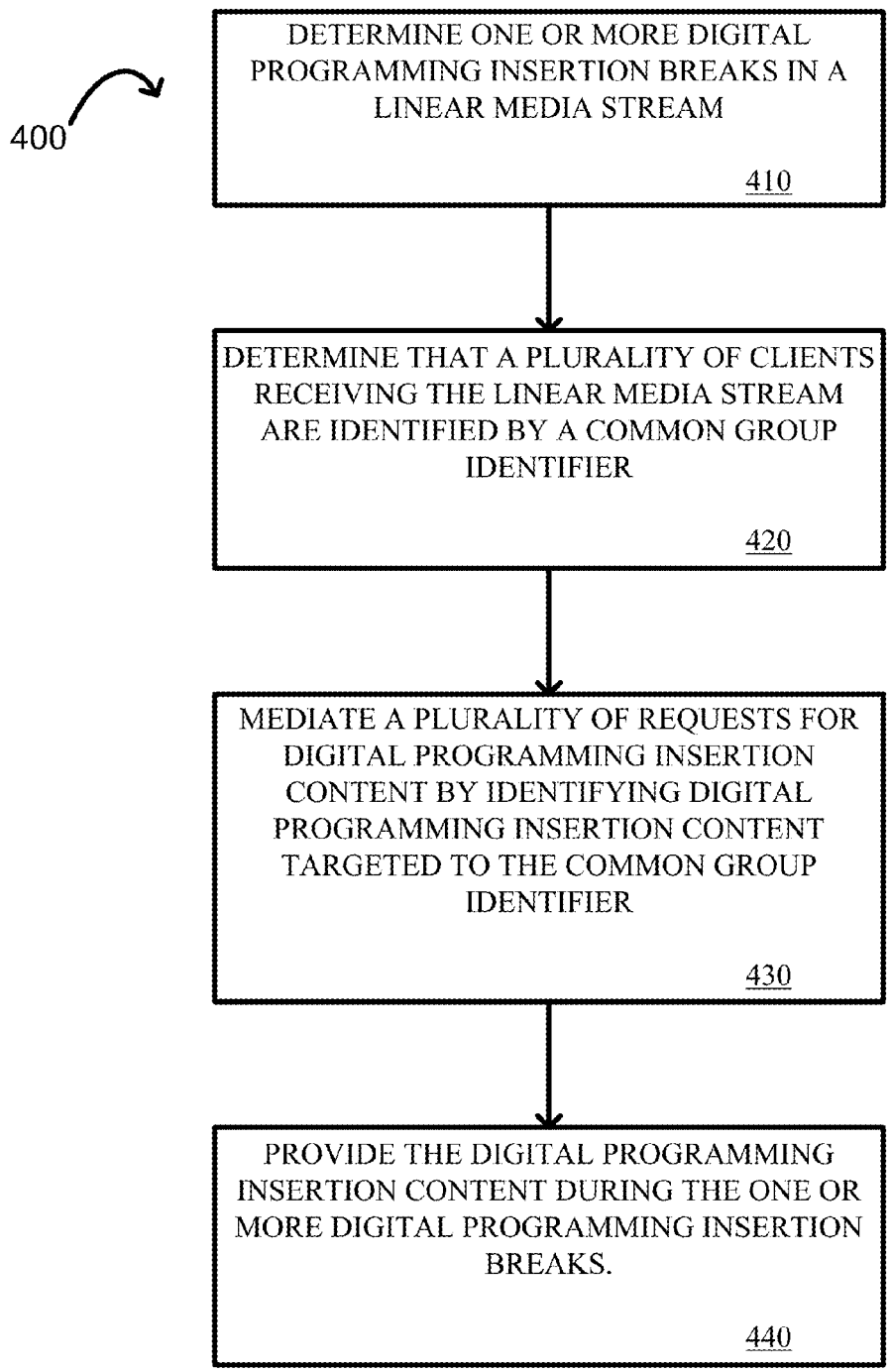
FIG. 4 is a flow chart illustrating an exemplary method for mediating digital program insertion for linear streaming media.

FIG. 4 is a flow chart illustrating an exemplary method 400 for mediating digital program insertion for linear streaming media. For illustrative purposes, the method 400 is described with reference to the elements of the flow of communications depicted in FIG. 2 and the system implementation depicted in FIG. 3. Other implementations, however, are possible.

The exemplary method 400 involves determining one or more DPI breaks in a linear media stream, as shown in block 410. The mediation application 114 can configure the processor 304 of the mediation system 104 to determine the one or more DPI breaks. The linear media stream can include primary content 112.

In an exemplary embodiment, determining the DPI breaks in a linear media stream can involve receiving data identifying one or more intervals in the linear media stream available for digital programming insertion. The mediation application 114 can identify one or more cues in the primary content 112 for inserting DPI content 116. A primary content provider 102 providing the football game as a linear media stream can provide data to the mediation application 114 identifying such cues. For example, a mediation application 114 can receive data from the primary content provider 102 providing a football game that a "time out" or other break in play during the game has occurred. The mediation application 114 can receive the content requests 205a-n for the DPI content 116. Based on receiving the requests, the mediation application 114 can determine that the DPI content 116 can be provided during the one or more intervals. If none of the clients 110 provides content requests 205a-n during a given interval, the mediation application 114 can determine that a DPI break does not occur during the interval.

The exemplary method 400 further involves determining that a plurality of clients in communication receiving the linear media stream are identified by a common group identifier, as shown in block 420. The client targeting module 202 of the mediation application 114 can configure the processor 304 of the mediation system 104 to identify a common group identifier for each of clients 110.

In an exemplary embodiment, each of the DPI content providers 106a-c can provide a group identifier to the mediation application 114. For example, a DPI content provider 106a may communicate a group identifier for males ages 16-24, a DPI content provider 106b may communicate a group identifier for females ages 30-45, and a DPI content provider 106c may communicate a group identifier for clients in the southwestern United States. Each of the DPI content providers 106a-c may be a different advertising content provider marketing a different product.

The exemplary method 400 further involves mediating a plurality of requests for DPI content 116 provided by a DPI content provider 106 by identifying DPI content targeted to the common group identifier, as shown in block 430. The DPI management module 204 of the mediation application 114 can configure the processor 304 of the mediation system 104 to identify DPI content for targeted to each of the groups associated with the group identifiers 206a-c.

For example, a DPI management module 204 may determine that males ages 16-24 should receive DPI content 116a from a DPI content provider 106a, that females ages 30-45 should receive DPI content 116b from a DPI content provider 106b, and that subscribers in the southwestern United States should receive DPI content 116c from a DPI content provider 106c.

In an exemplary embodiment, identifying the DPI content 116 can include retrieving DPI content 116 from a DPI content provider in response to a content request 205 from a first client. The mediation application 114 can configure the processor 304 to store the DPI content 116 in memory 302. The mediation application 114 does not retrieve content from the DPI content provider 106 in response to subsequent content requests from other clients associated with the same group identifier as the first client. The mediation application 114 can thus communicate a single request for DPI content 116 that can be provided to multiple clients 110. Communicating a single content request 205 for DPI content 116 can reduce the load on a DPI content provider 106 by obviating the need for a DPI content provider 106 to process a large number of requests for the same DPI content 116 from a large number of subscribers. The mediation application 114 can thus mediate requests for DPI content 116 from individual clients 110.

In additional or alternative embodiments, the mediation application 114 can request DPI content 116 specific to a group each time a client provides a group identifier different from any group identifiers previously provided to the mediation application 114. The mediation application 114 can receive a request associated with a first subscriber from a client for DPI content 116. The mediation application 114 can determine whether it has previously requested DPI content 116 in response to a different request associated with a previous subscriber having the same group identifier. If so, the mediation application 114 can provide the same DPI content 116 to the requesting subscriber. If not, the mediation application 114 can request DPI content 116 from a DPI content provider 106 associated with the group identifier of the requesting subscriber.

The exemplary method 400 further involves providing the digital programming insertion content 116 during the one or more digital programming insertion breaks, as shown in block 440. The DPI management module 204 of the mediation application 114 can configure the processor 304 of the mediation system 104 to provide DPI content 116a-c targeted to each of the groups associated with the group identifiers 206a-c in the DPI breaks of primary content 112. DPI content 116a targeted to a group associated with the group identifier 206a can be provided to clients 110a during the DPI breaks. DPI content 116b targeted to a group associated with the group identifier 206b can be provided to clients 110b during the DPI breaks. DPI content 116c targeted to a group associated with the group identifier 206c can be provided to clients 110c during the DPI breaks.

In additional or alternative embodiments, the mediation application 114 can provide DPI content 116 to a group of clients based on input received from one or more representative clients. For example, a mediation system 104 may communicate with 1 million clients 110 receiving primary content 112. The primary content 112 may include several DPI breaks. At each DPI break, the mediation application 114 may designate solicit input from a percentage of the clients 110 designated as representative clients for each group to identify the DPI content 116 that the mediation application 114 should provide to the clients in the group. The mediation application 114 can provide DPI content 116 to all of the clients in the group associated with the representative client based on a content request 205 received from the representative client.

In additional or alternative embodiments, the mediation application 114 can format the DPI content 116 for delivery to the clients 110. For example, DPI content 116a provided to clients 110a may be provided to different device types within the group of clients 110a. Accordingly, the DPI management module 204, rather than the DPI content provider 106a, can format the DPI content 116a for the different device types within the group of clients 110a. Furthermore, different clients 110 may use different formats for the DPI content 116. For example, a first client in the group of clients 110a may execute or otherwise use DPI content 116a formatted as an MPEG file while a second client in the group of clients 110a may execute or otherwise use DPI content 116a formatted as an AVI file. The mediation application 114 can provide the DPI content 116a in the appropriate format for the respective clients.

In additional or alternative embodiments, the DPI management module 204 can also manage multiple content renditions of common DPI content 116 to be provided to multiple clients 110 to ensure quality of service for the streaming of DPI content 116. Multiple renditions of the DPI content 116 can be encoded at different bit rates and sizes for delivery over different connection speeds between the mediation system 104 and the clients 110. The DPI management module 204 can manage a set of multiple renditions of the DPI content 116, thereby ensuring that DPI insertion occurs uniformly across the set. For example, a mediation application 114 targeting a given DPI content item to a group of clients 110 can target an entire set of renditions of the given DPI content item to the group of clients 110. When providing a DPI content item to a specific client 110, the mediation application 114 can select a rendition from the set of renditions of the DPI content item that is best suited to a data connection with the specific client 110. The mediation application 114 can determine the rendition appropriate for the data connection based on, for example, the speed of the data connection. The DPI management module 204 can determine a transmission rate for providing the DPI content that is a closest match (i.e., less than or equal to) the transmission rate of the primary content 112. Accordingly, a subscriber can view the DPI content 116 without discerning a difference in quality between the primary content 112 included in a linear media stream and the DPI7 content 116 provided with the linear media stream.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method, comprising:
    identifying, by a mediation application executed on a processor, one or more digital programming insertion breaks in a linear media stream, wherein the linear media stream comprises electronic content delivered over a network at a time determined by a content provider;
    determining, by the mediation application, that a plurality of clients in communication with the mediation application and receiving the linear media stream are identified by a common group identifier;
    mediating, by the mediation application, a plurality of requests for digital programming insertion content provided by a digital programming insertion content provider, wherein mediating the plurality of requests comprises:
        designating a representative subset of clients of the plurality of clients having the common group identifier, wherein the representative subset of clients includes fewer than all of the plurality of clients, and
        soliciting input from the representative subset of clients in response to the one or more digital programming insertion breaks occurring during the linear media stream; and
    providing, by the mediation application, the digital programming insertion content from the digital programming insertion content provider to the plurality of clients during the one or more digital programming insertion breaks based on the input received by the representative subset of clients.

2. The method of claim 1, wherein identifying the one or more digital programming insertion breaks comprises:
    receiving, by the mediation application, data identifying one or more intervals in the linear media stream available for digital programming insertion;
    receiving, by the mediation application, one or more requests for the digital programming insertion content; and
    determining, by the mediation application, that the digital programming insertion content can be provided during the one or more intervals.

3. The method of claim 1, wherein determining that the plurality of clients are identified by the common group identifier comprises determining that the plurality of clients are associated with a common demographic.

4. The method of claim 1, wherein determining that the plurality of clients are identified by the common group identifier comprises determining that the plurality of clients are associated with a common geographical area.

5. The method of claim 1, wherein mediating the plurality of requests further comprises requesting new digital programming insertion content from the digital programming insertion content provider based on determining that an additional client is identified by a different group identifier than a previously provided group identifier used for retrieving the digital programming insertion content from the digital programming insertion content provider.

6. The method of claim 1, wherein mediating the plurality of requests further comprises:
    retrieving the digital programming insertion content from the digital programming insertion content provider in response to a first content request from a first client having the common group identifier; and
    storing the digital programming insertion content in a non-transitory computer-readable medium;
    wherein providing the digital programming insertion content comprises providing the digital programming insertion content stored in the computer-readable medium to a second client having the common group identifier in response to a second content request from the second client.

7. The method of claim 1, wherein providing the digital programming insertion content comprises formatting the digital programming insertion content for delivery to each system associated with a client receiving the digital programming insertion content.

8. The method of claim 1, wherein providing the digital programming insertion content comprises maintaining a constant quality of service between the digital programming insertion content and the linear media stream.

9. A computing system comprising:
    a processor for executing instructions stored in a non-transitory computer-readable medium on one or more devices providing a mediation application;
    wherein the mediation application comprises one or more modules configured to perform operations comprising:
        identifying one or more digital programming insertion breaks in a linear media stream, wherein the linear media stream comprises electronic content delivered over a network at a time determined by a content provider;
        determining that a plurality of clients in communication with the mediation application and receiving the linear media stream are identified by a common group identifier;
        mediating a plurality of requests for digital programming insertion content provided by a digital programming insertion content provider, wherein mediating the plurality of requests comprises:
            designating a representative subset of clients of the plurality of clients having the common group identifier, wherein the representative subset of clients includes fewer than all of the plurality of clients, and
            soliciting input from the representative subset of clients in response to the one or more digital programming insertion breaks occurring during the linear media stream; and
        providing the digital programming insertion content from the digital programming insertion content provider to the plurality of clients during the one or more digital programming insertion breaks based on the input received by the representative subset of clients.

10. The system of claim 9, wherein the one or more modules of the mediation application are further configured to mediate the digital programming insertion content by performing operations comprising:
    retrieving the digital programming insertion content from the digital programming insertion content provider in response to a first content request from a first client having the common group identifier; and storing the digital programming insertion content in the computer-readable medium;

wherein providing the digital programming insertion content comprises providing the digital programming insertion content stored in the computer-readable medium to a second client having the common group identifier in response to a content request from the second client.

11. The system of claim 9, wherein the one or more modules of the mediation application are configured to identify the digital programming insertion content by requesting new digital programming insertion content from the digital programming insertion content provider based on determining that an additional client is identified by a different group identifier than a previously encountered group identifier.

12. A non-transitory computer-readable medium embodying program code executable by a computer system, the non-transitory computer-readable medium comprising:

program code for identifying one or more digital programming insertion breaks in a linear media stream, wherein the linear media stream comprises electronic content delivered over a network at a time determined by a content provider;

program code for determining that a plurality of clients in communication with a mediation application and receiving the linear media stream are identified by a common group identifier;

program code for mediating a plurality of requests for digital programming insertion content provided by a digital programming insertion content provider, wherein mediating the plurality of requests comprises:

designating a representative subset of clients of the plurality of clients having the common group identifier, wherein the representative subset of clients includes fewer than all of the plurality of clients, and soliciting input from the representative subset of clients in response to the one or more digital programming insertion breaks occurring during the linear media stream; and program code for providing the digital programming insertion content from the digital programming insertion content provider to the plurality of clients during the one or more digital programming insertion breaks based on the input received by the representative subset of clients.

13. The computer-readable medium of claim 12, wherein the program code for identifying the one or more digital programming insertion breaks comprises:

program code for receiving data identifying one or more intervals in the linear media stream available for digital programming insertion;

program code for receiving, by the mediation application, one or more requests for the digital programming insertion content; and program code for determining, by the mediation application, that the digital programming insertion content can be provided during the one or more intervals.

14. The computer-readable medium of claim 12, wherein the program code for determining that the plurality of clients are identified by the common group identifier comprises program code for determining that the plurality of clients are associated with a common demographic.

15. The computer-readable medium of claim 12, wherein the program code for determining that the plurality of clients are identified by the common group identifier comprises program code for determining that the plurality of clients are associated with a common geographical area.

16. The computer-readable medium of claim 12, wherein the program code for mediating the plurality of requests further comprises:

program code for retrieving the digital programming insertion content from the digital programming insertion content provider in response to a first content request from a first client having the common group identifier; and program code for storing the digital programming insertion content in a non-transitory computer-readable medium;

wherein the program code for providing the digital programming insertion content comprises program code for providing the digital programming insertion content stored in the computer-readable medium to a second client having the common group identifier in response to a content request from the second client.

17. The computer-readable medium of claim 12, wherein the program code for identifying the digital programming insertion content comprises program code for requesting new digital programming insertion content from the digital programming insertion content provider based on determining that an additional client is identified by a different group identifier than a previously encountered group identifier.

18. The method of claim 1, wherein mediating the plurality of requests further comprises:

transmitting a representative request from the plurality of requests to the digital programming insertion content provider;

determining that requests from the plurality of requests other than the representative request are not to be transmitted to the digital programming insertion content provider based on the plurality of clients being identified by the common group identifier; and receiving the digital programming insertion content from the digital programming insertion content provider in response to the representative request.

* * * * *